United States Patent [19]
Kline

[11] 4,050,615
[45] Sept. 27, 1977

[54] RIGID SADDLE BAG TYPE CARRIER FOR BICYCLES

[76] Inventor: Melbert A. Kline, 1157 Silverdale, Wichita, Kans. 67218

[21] Appl. No.: 613,573

[22] Filed: Sept. 15, 1975

[51] Int. Cl.² .............................................. B62J 9/00
[52] U.S. Cl. .................................. 224/32 A; 224/39; 280/202
[58] Field of Search .................... 224/32 R, 32 A, 35, 224/39, 43, 44, 30 R, 30 A; 280/202, 289 A; D12/158

[56] References Cited
U.S. PATENT DOCUMENTS

| 600,364 | 3/1898 | Hill | 224/32 A |
| 3,874,574 | 4/1975 | Heise | 224/32 A X |
| D. 224,074 | 6/1972 | Harmon | D12/158 |
| D. 237,167 | 10/1975 | Hanes | D12/158 |
| D. 237,168 | 10/1975 | Scott et al. | D12/158 |

FOREIGN PATENT DOCUMENTS

| 825,118 | 11/1937 | France | 224/32 A |
| 869,359 | 11/1941 | France | 224/32 A |
| 821,637 | 12/1937 | France | 224/32 A |
| 43,348 | 6/1938 | Netherlands | 224/32 A |
| 116,479 | 3/1946 | Sweden | 280/202 |

OTHER PUBLICATIONS
Cycle World, Travel Case, Feb. 1969, p. 10.

*Primary Examiner*—Robert J. Spar
*Assistant Examiner*—Winston H. Douglas
*Attorney, Agent, or Firm*—Edwin H. Crabtree; John H. Widdowson

[57] ABSTRACT

A rigid saddle bag type carrier for mounting to the rear of a bicycle. The carrier is streamlined in design and includes a bottom portion integrally molded with a concave surface for positioning the carrier over the top of the rear bicycle wheel. The carrier is mounted to the bicycle frame and the rear wheelaxle.

3 Claims, 7 Drawing Figures

U.S. Patent  Sept. 27, 1977  Sheet 1 of 2  4,050,615
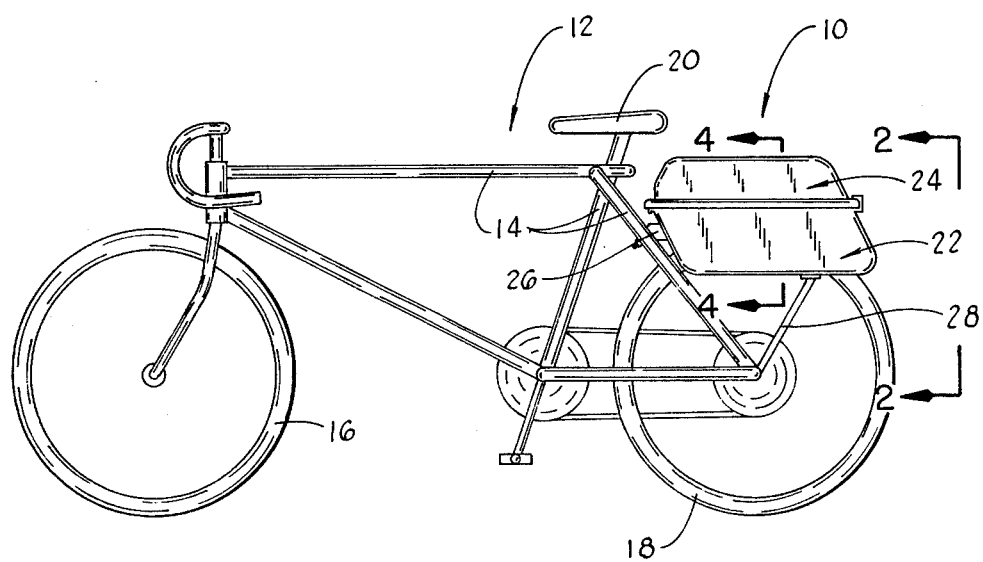
FIG-1
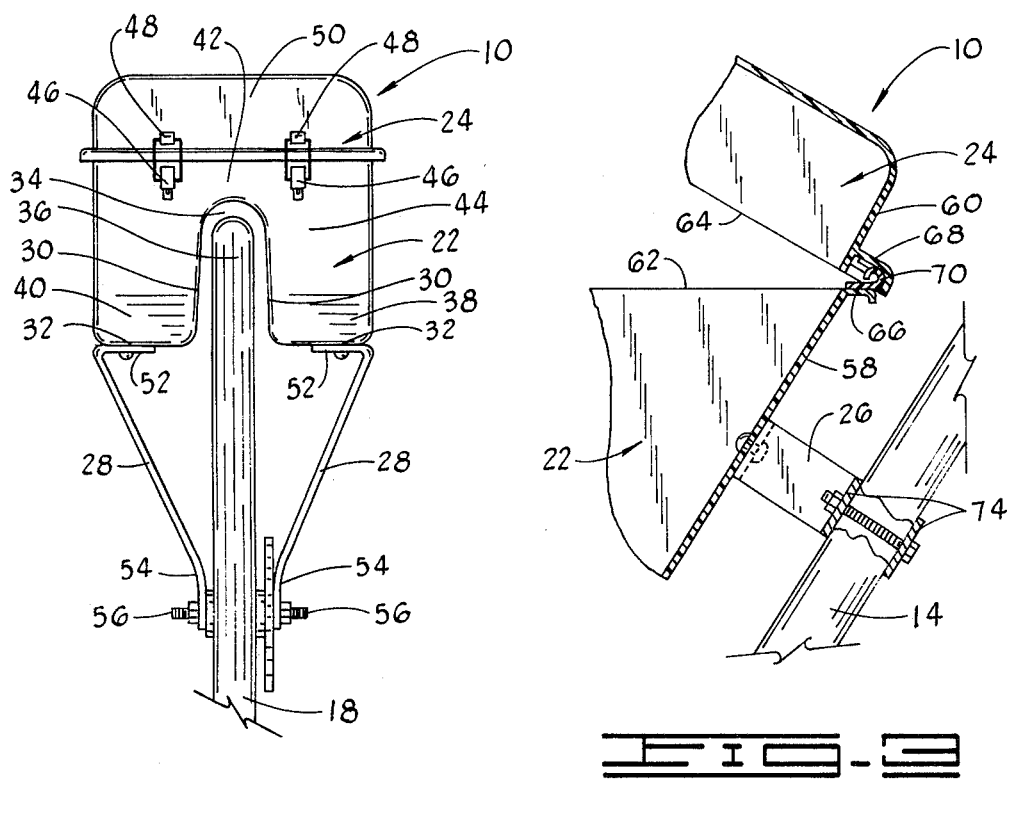
FIG-2
FIG-3

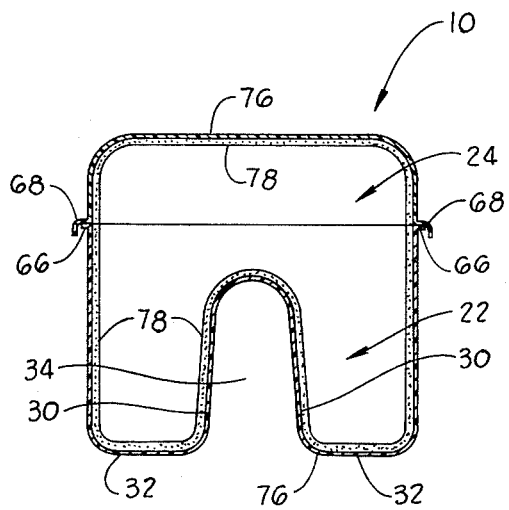
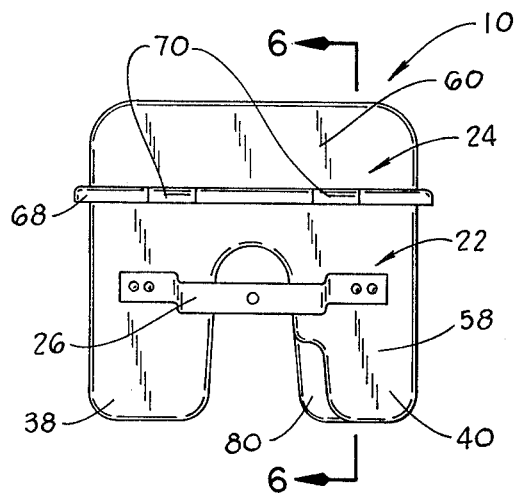
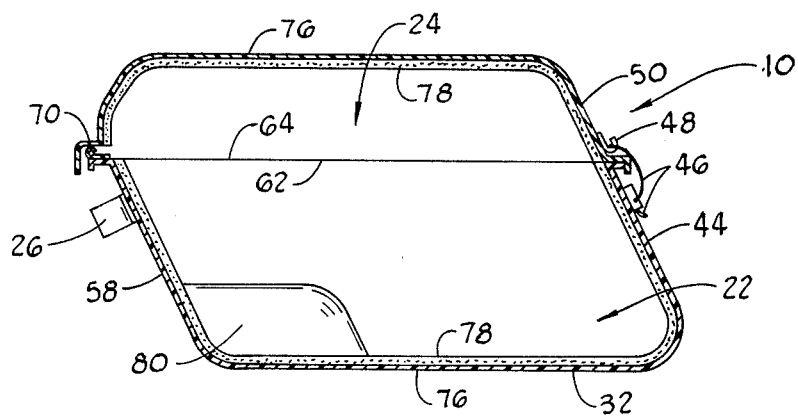
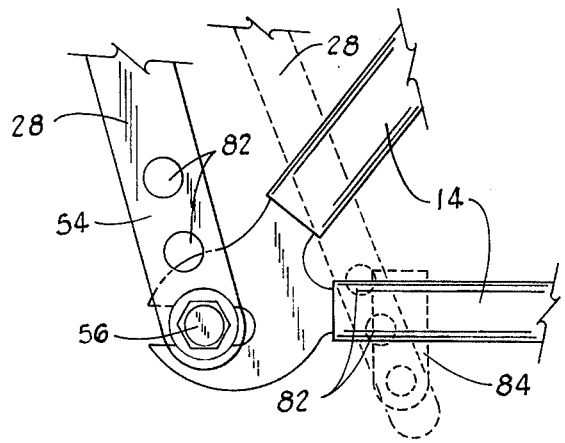

4,050,615

RIGID SADDLE BAG TYPE CARRIER FOR BICYCLES

BACKGROUND OF THE INVENTION

This invention relates generally to bicycle accessories and more particularly, but not by way of limitation, to a carrier for mounting to the rear of a bicycle.

Heretofore carriers have included bag or box type compartments that are mounted on the rear of a bicycle and positioned on both sides of the rear bicycle wheel. The carriers are mounted to the bicycle frame by various means such as leather straps, springs, and metal brackets. None of the prior art bicycle carriers disclose the novel structure of the rigid saddle bag type carrier as herein described.

SUMMARY OF THE INVENTION

The subject invention is steamlined in design, waterproof, light weight, and compact. The carrier is integrally molded to be positioned over a top portion of the rear bicycle wheel thereby taking advantage of carrying space above and on both sides of he rear wheel.

Because of the carriers increased carrying space many articles such as groceries, beverages, cloths, brief cases, camping gear and sporting goods can be easily carried. The carrier can be quickly mounted to the rear of any type of bicycle such as a three-speed and ten-speed model.

The rigid saddle bag type carrier includes an elongated case having a bottom portion with an integrally molded concave surface for positioning the case over the rear bicycle wheel. The case includes an open top portion which is hinged at one end to a case lid and latched at the other end thereby providing a sealed waterproof carrier. The carrier is mounted to the frame by a mounting bracket attached to the front portion of the case, the bottom portion of the case has mounting braces attached thereto and extending downwardly on both sides of the bicycle wheel. The ends of the mounting braces are attached to the rear wheel axle.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a side view of a bicycle with the rigid saddle bag type carrier mounted above the rear bicycle wheel.

FIG. 2 is a rear view of the carrier taken along section lines 2—2 shown in FIG. 1.

FIG. 3 is a partial sectional side view of the from portion of the carrier attached to the bicycle frame.

FIG. 4 is a sectional end view taken along section lines 4—4 shown in FIG. 1.

FIG. 5 is a front view of the rigid saddle bag type carrier.

FIG. 6 is a sectional side view taken along lines 6—6 shown in FIG. 5.

FIG. 7 is a pratial side view of the carrier's mounting braces attached to the rear wheel axle.

DETAILED DESCRIPTION OF THE DRAWINGS

In FIG. 1 the rigid saddle bag type carrier is characterized by general reference number 10. The carrier 10 is mounted to the rear of a bicycle 12. The bicycle 12 includes a bicycle frame 14, a front wheel 16, a rear wheel 18, and a seat 20. The carrier 10 includes a case 22, a case lid 24, a front mounting bracket 26 and rear mounting braces 28.

FIG. 2 illustrates a rear view of the carrier 10 taken along section lines 2—2 shown in FIG. 1. In this view a concave surface 30 of a bottom portion 32 of the case 22 can be seen. The concave surface 30 provides an opening 34 which is positioned over an upper portion 36 of the rear wheel 18. Case 22 further includes side portions 38 and 40 positioned on both sides of the upper portion 36 of the rear wheel 18. The side portions 38 and 40 are open to one another via a center portion 42 positioned above the rear wheel 18.

A rear portion 44 of the case 22 includes a latch 46 which is attached to a hook 48. The hook 48 is mounted to a rear portion 50 of the case lid 24.

In this view the rear mounting braces 28 are seen attached at one end 52 to two horizontal surfaces of the bottom portion 32 of the case 22. The other end 54 of the braces 28 are bolted to the rear wheel axle 56.

In FIG. 3 a partial sectional view of the front portion 58 of the case 22 and the front portion 60 of the case lid 24 is seen. Also seen in this view is the open top portion 62 of the case 22 and the open bottom portion 64 of the case lid 24. The top portion 62 and the bottom portion 64 include outwardly extending flange portions 66 and 68 extending around the periphery of their open portions. When the case lid 24 is closed on top of the case 22 the flange portion 68 of the case lid 24 extends over the flange portion 66 thereby sealing the carrier 10 in a closed position and preventing any water from leaking therein.

At the front portion 58 and 60 of the case 22 and case lid 24 are hinges 70 for hingeably opening the case lid 24 from the case 22.

The front portion 58 of the case 22 is mounted to the frame 14 by a U-shaped mounting bracket 26 which is bolted to mounting plates 74 positioned on the frame 14.

FIG. 4 is a rear sectional view taken along section lines 4—4 shown in FIG. 1. In this view the flange portion 68 of the case lid 24 can be seen disposed against the flange portion 66 of the case 22.

The case 22 and case lid 24 can be made of any light weight rigid material 76 such as plastic, fiber glass, or the like. Inside the case 22 and the case lid 24, the material 76 can be insulated by an insulating foam 78 or the like. The insulating of the carrier 10 is used to protect the articles stored inside thereof.

FIG. 5 is a front view of the carrier 10 showing the front portion 58 of the case 22 and the front portion 60 of the case lid 24 hinged together by hinges 70. The U-shaped mounting bracket 26 can be seen attached to the front portion 58. A dent 80 is shown in the inside surface of the side portion 40 of the case 22. The dent 80 is required to provide space for a generator should it be mounted to the rear of the bicycle 12.

FIG. 6 is a side sectional view of the carrier 10 taken along sectional lines 6—6 shown in FIG. 5. In this view the carrier 10 is shown in a closed positions with latch 46 secured to hook 48 sealing together the open top portion 62 of the case 22 and the open bottom portion 64 of the case lid 24. Also sen in this view is the contour of the side of the dent 80.

FIG. 7 illustrates the frame 14 bolted to the rear axle 56 of the wheel 18. The ends 54 of the rear mounting braces 28 include apertures 82 therein for adjusting the level of the carrier 10 when it is mounted to the axle 56.

An alternate embodiment for attaching the carrier 10 to the frame 14 is the use of a clamp 84 shown in dotted lines. In this embodiment the brace 28 shown in dotted lines would be adjusted using apertures 82 in dotted lines and attached to the clamp 84 on the frame 14 rather than using the wheel axle 56.

Changes may be made in the construction and arrangement of the parts of elements of the embodiments are disclosed herein without departing from the spirit or scope of the invention as defined in the following claims.

I claim:

1. A rigid saddle bag type carrier for a bicycle, the carrier comprising:

an elongated case secured to the rear portion of the bicycle and disposed above the rear wheel axle, the case having a front portion, a rear portion, an open top portion, a bottom portion, and two side portions with each side portion positioned adjacent to a side of the wheel, the bottom portion including two horizontal surfaces with each horizontal surface positioned adjacent a side of the wheel and a concave surface in the center thereof and extending therethrough for receiving a top portion of the rear bicycle wheel therebetween, the side portions of said case positioned on both sides of the rear bicycle wheel and open to one another via an open inner portion positioned above the top portion of the rear bicycle wheel, the front portion and rear portion of said case angled upwardly and forwardly toward the front of the bicycle;

an elongated case lid hingedly mounted on the top of the open portion of said case, said case lid having a rear portion angled upwardly and forwardly toward the front of the bicycle;

a "U" shaped front mounting bracket attached to the front portion of said case, said front mounting bracket secured to the bicycle frame by a threaded bolt and nut attached to a mounting plate disposed adjacent the bicycle frame, the bolt received through an aperture in said bracket and said plate;

a pair of inclined, elongated mounting braces, one of said mounting braces positioned on one side of the rear wheel and having a horizontal upper end portion attached to one of said horizontal surfaces of the bottom portion adjacent to one of said side portions of said case and a lower end extending downwardly and bolted to one side of the rear wheel axle, and the other of said mounting braces positioned on the other side of the rear wheel and having a horizontal upper end portion attached to the other of said horizontal surfaces of the bottom portion adjacent to the other of said side portions of said case and a lower end extending downwardly and bolted to the other side of the rear wheel axle and;

flange portions extending outwardly around the periphery of said case lid, said flange portions overlapping flange portions extending outwardly around the periphery of the open top portion of said case, said flange portions of said case lid disposed against the flange portions of said case when said case lid is disposed adjacent said case.

2. The carrier as described in claim 1, wherein the front portion of said case includes a hinge attached to the front portion of said case, the rear portion of said case having a latch for engaging a hook attached to the rear portion of said case lid.

3. The carrier as described in claim 1, wherein said case includes a concave dent portion in the inside surface of one of the side portions of said case, said dent portion receiving a portion of a generator when attached to the bicycle frame.

* * * * *